(12) United States Patent
Thomson

(10) Patent No.: US 10,337,201 B2
(45) Date of Patent: Jul. 2, 2019

(54) FAST FILL AND SHUT OFF SYSTEM

(71) Applicant: Solomon Thomson, Oceanside, CA (US)

(72) Inventor: Solomon Thomson, Oceanside, CA (US)

(*) Notice: Subject to any disclaimer, the term of this patent is extended or adjusted under 35 U.S.C. 154(b) by 214 days.

(21) Appl. No.: 15/441,201

(22) Filed: Feb. 23, 2017

(65) Prior Publication Data

US 2018/0238067 A1    Aug. 23, 2018

(51) Int. Cl.
  *E04H 4/14*    (2006.01)
  *F16K 21/18*   (2006.01)
  *G05D 9/00*    (2006.01)

(52) U.S. Cl.
  CPC ............ *E04H 4/14* (2013.01); *F16K 21/185* (2013.01); *G05D 9/00* (2013.01)

(58) Field of Classification Search
  CPC ............ E04H 4/14; F16K 21/185; G05D 9/00
  USPC ....................... 137/411, 412; 4/506–509, 665
  See application file for complete search history.

(56) References Cited

U.S. PATENT DOCUMENTS

| | | | |
|---|---|---|---|
| 1,346,898 A * | 7/1920 | Kingsbury | G01F 23/243 137/392 |
| 3,809,116 A * | 5/1974 | Sanner | B01D 53/26 137/391 |
| 4,853,986 A * | 8/1989 | Allen | E04H 4/12 4/508 |
| 5,203,038 A * | 4/1993 | Gibbs | E04H 4/12 4/508 |
| 5,836,022 A * | 11/1998 | Busenga | E04H 4/12 4/508 |
| 7,740,032 B2 * | 6/2010 | Reusche | A01K 45/002 119/69.5 |
| 9,846,071 B1 * | 12/2017 | Hallford | E04H 4/12 |
| 2009/0260149 A1 * | 10/2009 | Booth | E04H 4/12 4/508 |
| 2010/0212598 A1 * | 8/2010 | Jones | A01K 63/006 119/269 |
| 2011/0036164 A1 * | 2/2011 | Burdi | G01F 23/241 73/303 |
| 2013/0007954 A1 * | 1/2013 | Sutton | F16K 31/52483 4/490 |
| 2013/0067654 A1 * | 3/2013 | Deloche | E04H 4/1209 4/507 |
| 2017/0235318 A1 * | 8/2017 | Bright | G05D 9/12 137/2 |
| 2018/0238067 A1 * | 8/2018 | Thomson | E04H 4/14 |

* cited by examiner

*Primary Examiner* — Joshua E Rodden
(74) *Attorney, Agent, or Firm* — Greenspoon Marder LLP; Todd Langford

(57) ABSTRACT

A portable apparatus for filling a pool or vessel in rapid form as well as sensing water level and terminating fill source. An apparatus including of a base element placed beside pool edge on which will seat one or more high flow electric liquid shut off valves connected to fill fluid source. Also extending from base is a horizontal adjustable supporting member to which attaches a vertical supporting member onto which liquid sensing device would be attached. High flow electric liquid shut off valves respond to and are a slave to liquid level sensing device by electric connection allowing fluid level sensor to determine when full flow electric liquid shut of valve opens or closes.

20 Claims, 2 Drawing Sheets

FAST FILL AND SHUT OFF SYSTEM

BACKGROUND

The present invention is an apparatus used for filling quickly a vessel for example a pool with a water or fluid as well as sensing desired fill level and automatically shutting off source water when water reaches desired level.

This apparatus would be a tool used by a pool builder, pool remodel company, or a pool service and repair company to quickly fill an empty pool without the need for a person to monitor water level in order to shut off water source once water reached desired level to avoid over filling or flooding the home, landscape etc.

Empty pools should be filled quickly whether to avoid new plaster from cracking or previously filled pools from shifting after being drained of the weight of the water. Reason one may be forced to drain a pool would be due to algae, poor water quality, or to perform a repair of some kind etc. Simply put this invention would be used by anyone who wants a pool filled after draining or for filling a new pool at a quicker rate then a built in auto fill system or one of the other portable mechanical or electrical water leveling systems that have been invented are capable of filling a pool.

The devices invented which are similar to this one are intended for maintaining a pools water level for example Michael Gibbs invention U.S. Pat. No. 5,203,038. However the Gibbs invention and the others will not fill a pool quickly from bottom to top as those inventions are intended only to maintain a pools water level. Maintaining a pools water level does not require their inventions to deliver water at a fast rate as pool water auto fillers and level controllers are designed to replenish water that is lost due to evaporation or water that comes out due to bather splash out which is a minimal amount of water, therefore pool auto fillers and level controller output pressure is very low, furthermore the mechanical pivoting style float design they generally use cannot fully close off high pressure water. It would take several days to possibly a week for his or the other similar inventions to fill a regular size pool from empty to full. This invention has the capability of filling a pool in a much shorter time frame by utilizing electrical high flow valves.

This Invention is a portable unit designed for professionals in the pool industry to use at any location needed for rapid unmonitored pool filling.

RELATED INVENTIONS

U.S. Pat. No. 6,006,605
U.S. Pat. No. 5,203,038
U.S. Pat. No. 4,853,986
U.S. Pat. No. 4,655,243
U.S. Pat. No. 4,644,0307
U.S. Pat. No. 4,621,657
U.S. Pat. No. 4,586,532
U.S. Pat. No. 4,574,405
U.S. Pat. No. 2,739,939

SUMMARY

The objective of the present invention is to provide one that must fill up an empty pool or vessel of many different variances quickly. Furthermore provide a shut off device which is capable of stopping a high-pressure water source successfully and completely. Furthermore providing a water sensing device to signal water shut off device to close off water source at desired water level, therefore no one need be required at filling site for the length of time needed for vessel to be filled.

Figure 1:
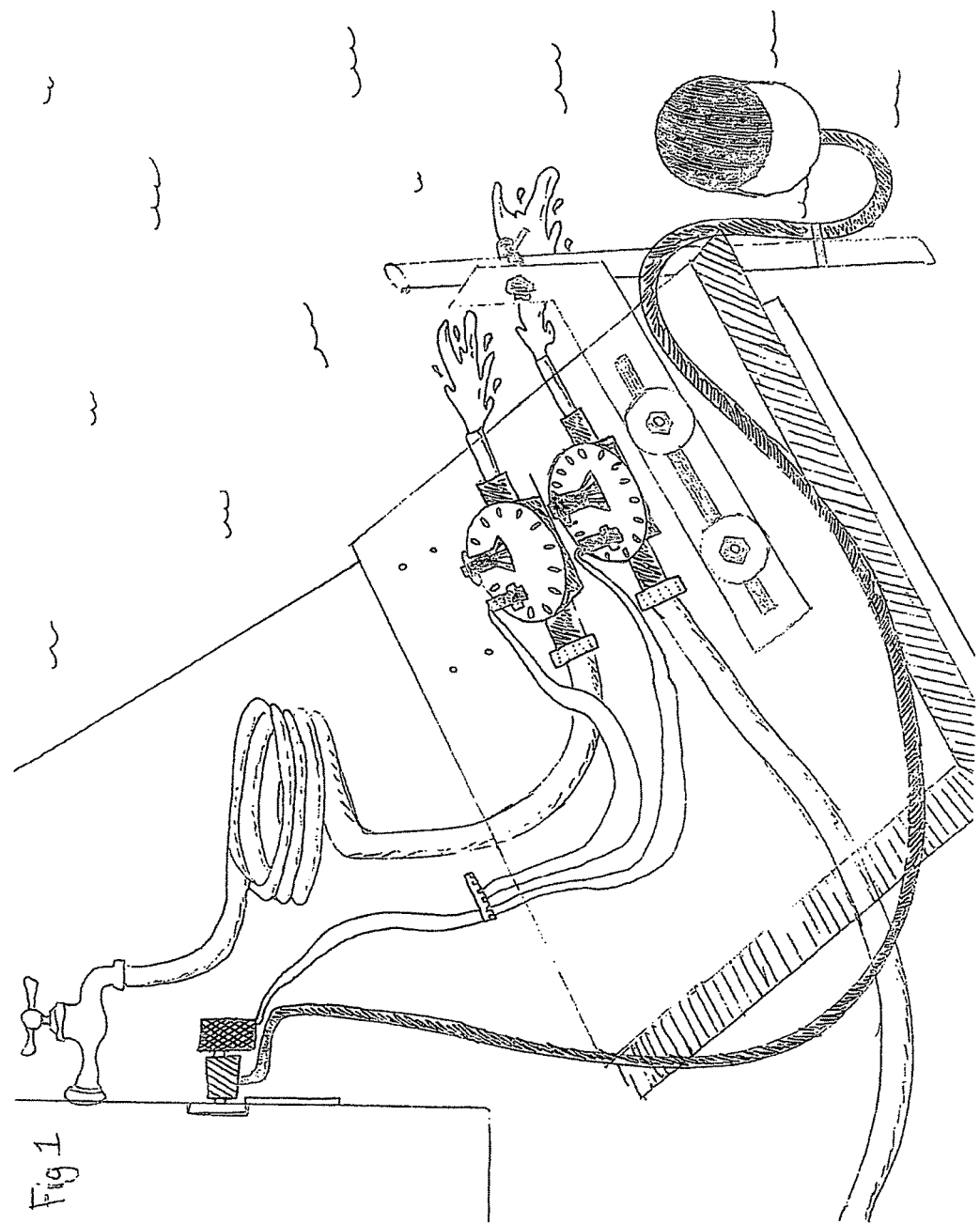
FIG. 1 shows apparatus as it may be used in the field, placed on a pool deck and in it's working state prior to water reaching its desired level and water off position.
Figure 2:
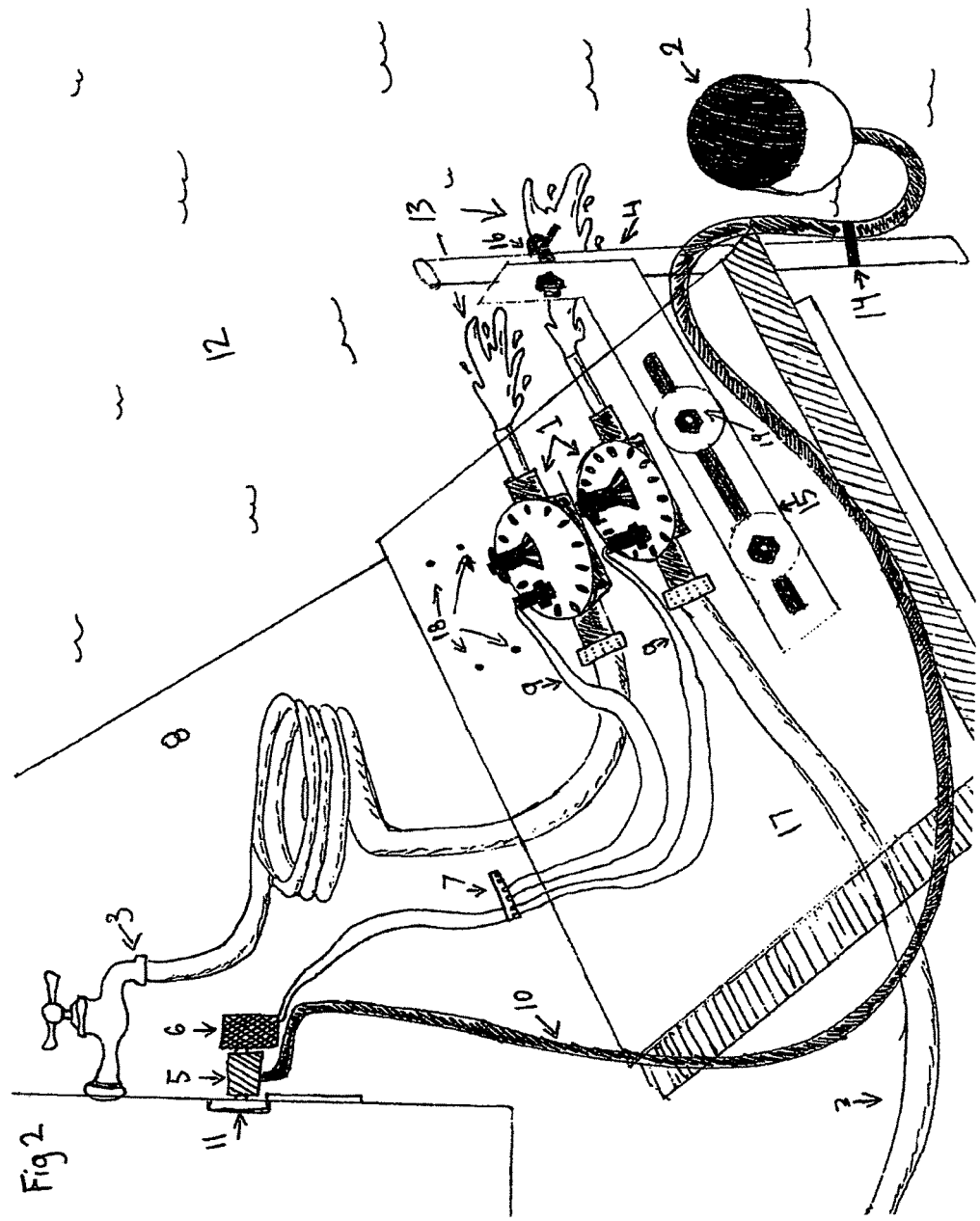
FIG. 2 is identical to figure one but a numbered diagram showing all apparatus parts as well as sources it will need to complete its task such as electricity and water source.

1—full high flow fluid shut off valve/valves
2—fluid sensing device e.g. reverse tethered float
3—water source
4—vertical support member
5—fluid sensing device e.g. float piggyback plug
6—full flow valve plug
7—additional full flow valve power ports
8—deck (e.g. Pool deck)
9—full flow valve power wires
10—10-fluid sensing device power cord
11—electrical power source
12—pool or vessel to be filled
13—water entering pool or vessel
14—band or clamp (e.g. Zip tie)
15—bracket or horizontal support member
16—fitting to connect horizontal support member to vertical support member
17—plastic base
18—additional valve port
19—clamp fastening system

DETAILED DESCRIPTION OF INVENTION description of this invention would include a base element made of plastic, fiberglass or a material proven to be durable and provide longevity in wet locations (17). Base would be raised up in order to allow float support arms and valve outlets to clear any raised coping and provide greater options for use. In addition base will be heavy enough to keep apparatus sturdy throughout its procedure. In addition base has holes and ports used to fasten apparatus parts to it using fasteners. A horizontal support arm (15) is connected to base and may be a sliding arm which could extend forward or backwards to achieve desired length horizontally, once horizontal support arm is extended to desired length a clamp or screwing system (19) would fasten horizontal support arm down for security. A vertical support arm (4) would attach to horizontal support arm (15) with a connector between the two (16) which may allow for vertical arm to slide up or down through it to achieve desired depth down into pool or a vessel to be filled, connector (16) would then tighten down around vertical support arm (4) once user has adjusted vertical support arm (4) to desired depth. A clamp, zip tie or band (14) would fasten the water sensing device power cord (10) to the vertical support arm which would be the pivoting point for the water sensing device e.g. reverse tethered float (2). Water sensing device e.g. Reverse tethered float is an electrically powered regularly on sensor or float which only closes when sensor or float is raised up to desired set point. Where ever band (14) fastens cord to vertical support arm would allow user to determine where float off position would be through trial procedure prior to turning on water source. Water sensing device or float is equipped with a piggyback plug or electrical connector of the sort (5) which would allow power cord for electric water valve (6) to connect to it. Electric water valve e.g. rain bird, orbit, or irritrol style irrigation high pressure electric water valve (1) would fasten down onto base (17) using zip ties, screws or another fastening system to temporarily or permanently fasten valve steadfast on to base. Base is capable of seating multiple high-pressure electric water valves. (18) shows an open port for fastening yet another valve. (7) shows a multi-port connector for multiple valves electrical wiring to be connected to one power source e.g. Low voltage transformer therefore allowing all valves to behave as one. Water valve/s transformer or power source would be a slave to float or water sensing device. Simply put electricity would only be fed to water valve/s if water sensing device is in its regularly on position which is while filling position. When water sensing device has been raised by pool water or fill fluid to pool desired predetermined full point electricity would be terminated at its piggyback plug hence terminating electricity being sent to transformer or high-pressure water valve electrical plug. High-pressure water valves are also a regularly on valve when powered. When electricity is terminated to valve, valve closes. Water source (3) conventional spicket or the like would be connected through a conventional garden hose or such to valve connector at valve inlet. Once invention has been set up beside empty pool or vessel to be filed and float or switch set to desired fill point water source may be activated, electrical cord plug with piggyback plug or the like for water sensing device e.g. reverse tether float would be plugged into electrical power source (11) e.g. conventional 120-volt receptacle, full flow fluid shut off valve cord plug (6) would insert into fluid sensing device power cord piggy back plug or the like (5)). Water will then flow through high pressure valve and into the vessel or pool until water reaches water sensing device or float, hence triggering fluid sensor or raising reverse tether float up to desired full point of vessel or pool. Once fluid sensing device has been triggered or float reaches predetermined level electricity would then be terminated at piggyback plug or connection to transformer or power source for valve/s therefore shutting valve securely stopping flow through valve and into pool or vessel. This is how system works.

I claim:

1. An apparatus comprising
a horizontal member movably secured to a base, a vertical member movably secured to an end of the horizontal member, a fluid level sensor secured to the vertical member, a plurality of fill valves secured to the base, and a piggyback plug electrically connected to the fluid level sensor, where the plurality of fill valves are electrically connected to the piggyback plug.

2. The apparatus of claim 1, wherein the fluid level sensor is a reverse tethered float.

3. The apparatus of claim 1, wherein the plurality of fill valves are electrically connected to the piggyback plug via a multi-port connector.

4. The apparatus of claim 3, further comprising a low power transformer electrically connected between the piggyback plug and the multi-port connector.

5. The apparatus of claim 1, wherein each of the plurality of fill valves is a high-pressure electric water valve.

6. The apparatus of claim 5, wherein each high-pressure electric water valve is open when power is supplied to the respective high-pressure electric water valve.

7. The apparatus of claim 1, wherein the fluid level sensor upon triggering terminates power supplied to the plurality of fill valves via the piggyback plug.

8. The apparatus of claim 1, further comprising a plurality of fasteners, where the plurality of fasteners secures the horizontal member to the base.

9. The apparatus of claim 1, further comprising a fastener, where the fastener secures the fluid level sensor to the vertical member.

10. A method of filling a vessel with a fluid comprising the steps of
placing a filling apparatus near an edge of the vessel, where the filling apparatus comprises a horizontal member movably secured to a base, a vertical member movably secured to an end of the horizontal member, a fluid level sensor secured to the vertical member, a plurality of fill valves secured to the base, and a piggyback plug electrically connected to the fluid level sensor, where the plurality of fill valves are electrically connected to the piggyback plug;
connecting each of the fill valves to a water source, and inserting the piggyback plug into an electrical outlet;
whereby fluid is filled into the vessel.

11. The method of claim 10, further comprising the steps of waiting a period of time until the fluid level sensor is triggered thereby causing the plurality of fill valves to close.

12. The method of claim 10, wherein the fluid level sensor is a reverse tethered float.

13. The method of claim 10, wherein the plurality of fill valves are electrically connected to the piggyback plug via a multi-port connector.

14. The method of claim 13, wherein the filling apparatus further comprises a low power transformer electrically connected between the piggyback plug and the multi-port connector.

15. The method of claim 10, wherein each of the plurality of fill valves is a high-pressure electric water valve.

16. The method of claim 15, wherein each high-pressure electric water valve is open when power is supplied to the respective high-pressure electric water valve.

17. The method of claim 10, wherein the fluid level sensor upon triggering terminates power supplied to the plurality of fill valves via the piggyback plug.

18. The method of claim 10, wherein the vessel is a pool.

19. The method of claim 10, wherein the fluid is water.

20. A pool filling apparatus comprising
a horizontal member movably secured to a base, a vertical member movably secured to an end of the horizontal member, a reverse tethered float sensor secured to the vertical member, a plurality of fill valves secured to the base, a piggyback plug electrically connected to the reverse tethered float sensor, a multi-port connector, and a low power transformer, where the plurality of fill valves are electrically connected to the piggyback plug via the multi-port connector, and where the low power transformer is electrically connected between the piggyback plug and the multi-port connector.

* * * * *